United States Patent
Baisley

(10) Patent No.: US 6,766,457 B1
(45) Date of Patent: Jul. 20, 2004

(54) METHOD FOR CONTROLLING ACCESS TO A MULTIPLICITY OF OBJECTS USING A CUSTOMIZABLE OBJECT-ORIENTED ACCESS CONTROL HOOK

(75) Inventor: Donald Edward Baisley, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/456,768

(22) Filed: Dec. 7, 1999

(51) Int. Cl.[7] ............................................. G06F 12/14
(52) U.S. Cl. ......................... 713/201; 707/9; 713/167
(58) Field of Search ............................. 713/200, 201, 713/167; 707/9

(56) References Cited

U.S. PATENT DOCUMENTS

| | | | | |
|---|---|---|---|---|
| 5,557,793 A | * | 9/1996 | Koerber | |
| 5,581,755 A | * | 12/1996 | Koerber et al. | |
| 5,644,766 A | * | 7/1997 | Coy et al. | |
| 5,671,398 A | * | 9/1997 | Neubauer | |
| 5,701,472 A | * | 12/1997 | Koerber et al. | |
| 5,721,925 A | * | 2/1998 | Cheng et al. | |
| 5,758,348 A | * | 5/1998 | Neubauer | |
| 5,765,039 A | * | 6/1998 | Johnson et al. | |
| 5,848,273 A | * | 12/1998 | Fontana et al. | |
| 5,889,992 A | * | 3/1999 | Koerber | |
| 5,903,720 A | * | 5/1999 | Stokes | |
| 6,202,066 B1 | * | 3/2001 | Barkley et al. | 707/9 |
| 6,256,393 B1 | * | 7/2001 | Safadi et al. | 380/232 |
| 6,412,070 B1 | * | 6/2002 | Van Dyke et al. | 713/200 |

OTHER PUBLICATIONS

The Java Tutorial, "Examining Classes", http://java.sun.com/docs/books/tutorial/reflect/class/getConstructors.html.*

\* cited by examiner

Primary Examiner—Gilberto Barrón
Assistant Examiner—Andrew Nalven
(74) Attorney, Agent, or Firm—Nathan Cass; Mark T. Starr; Lise A. Rode

(57) ABSTRACT

A computer-implemented object-oriented method for controlling access to a multiplicity of objects is disclosed. The method includes creating specific access control object types, each including a pre-check method for implementing a pre-defined access control policy. Each one of the multiplicity of objects to be controlled is then associated with one of the access control objects. Next, upon an attempt to invoke a feature of any one of the multiplicity of objects, a determination is made if one of the multiplicity of objects is linked to an access control object, and if yes; the pre-check method for the access control object associated with the one of the multiplicity of objects is performed to determine whether to grant access.

19 Claims, 6 Drawing Sheets

METHOD FOR CONTROLLING ACCESS TO A MULTIPLICITY OF OBJECTS USING A CUSTOMIZABLE OBJECT-ORIENTED ACCESS CONTROL HOOK

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of managing access control in computing systems and more particularly to an object-oriented software method for controlling access to objects and to features of those objects.

BACKGROUND OF THE INVENTION

Access Control refers to a method for restricting access to a system. Such a system could be hardware or software or any other system, such as a repository functioning as a persistent store for object oriented models. Access control methods typically take the form of a policy that has two major functions. First, it defines the nature of control itself, meaning the features and functions that can be accessed. Second, such an access control policy administers control by defining the type of users who would have access to the features and functions defined previously.

An access control policy can be implemented in many ways. An example from the prior art where such an access control policy has been implemented is disclosed in U.S. Pat. No. 5,903,720, which issued May 11, 1999, entitled "Object System Capable of Using Different Object Authorization Systems". This patent discloses an access control, which is implemented for accessing "a plurality of different object authorization systems" from an "object system". The disclosed system requires an authorization system table to be maintained by the object system; and each of the plurality of authorization systems is to be registered as an entry in this authorization table. A problem with this approach is that it makes access control rigid with the need for changing the authorization table each time a user defined authorization system needs to be added.

Further, the system disclosed in the above-cited patent requires that at the time of registering in the authorization table, an "authorization system" is provided to the object system, with pointers to the functions provided by the authorization system. The authorization systems are associated with structures that are not strictly object-oriented in the sense that they are not encapsulated as objects to take advantage of object polymorphism. Thus, this prior art access control system does not provide a framework for defining extensible access control policies.

Another disadvantage if prior art is that, every time access to an object is required, the whole authorization functionality will need to be executed even for recursive calls on the same object to which access has already been granted. This is a serious overhead burden where an object needs to be accessed repeatedly because there will be repeated executions of the authorization functionality each time access is requested.

Another disadvantage with the prior art, as disclosed in the above-cited patent is that it does not support access control of the authorization systems themselves, because the authorization systems and system tables are not modeled as objects which can be controlled by the authorization systems. This may be necessary to preserve the security of the authorization system.

Still another disadvantage with prior art is that while being suited to large grained objects such as files and storage systems, it is not efficient for use with great numbers of fine grained objects such as model elements, each element being tied to its own access control policy.

It is apparent from the above that an access control system implementing an access control policy as an operation of an access control object (which can be invoked every time an access request is received) can solve many of the problems encountered with the prior art.

SUMMARY OF THE INVENTION

It is an object of this invention to provide a method for controlling access to a multiplicity of different objects using a customizable object-oriented access control hook.

It is another object of this invention to encapsulate access control policies in objects so that a variety of access control policies are accomplished through object polymorphism.

Another object of this invention is to provide for an access control object associated with each object in an object system, so that access control is managed from within each object. This reduces the overhead of maintaining authorization structures and tables separate from the objects being controlled.

Yet another object of this invention is to provide a method whereby, having determined that access is granted to an object for a first time, access is automatically granted to recursive requests on the same object.

Still another object of this invention is to provide a method for controlling access to access control.

An advantage of this invention is that it provides a method for controlling access to great numbers of objects in an object-oriented store. This access control is customizable so that different access control policies can be defined for each individual object. Thus the method of this invention efficiently scales up to handle a multiplicity of objects and a multiplicity of access control policies.

A feature of this invention is that it recognizes system administrators as having special access rights, which bypass the access control policies of individual objects.

Another feature of the present invention is that an access control policy on a class object can control construction of new objects and can put new objects under access control before construction is complete.

These and other objects, which will become apparent as the invention is described in detail below, wherein a computer-implemented object-oriented method for controlling access to a multiplicity of objects is disclosed. The method includes creating specific access control object types, each including a pre-check method for implementing a pre-defined access control policy. Each one of the multiplicity of objects to be controlled is then associated with one of the access control objects. Next, upon an attempt to invoke a feature of any one of the multiplicity of objects, a determination is made if one of the multiplicity of objects is linked to an access control object, and if yes; the pre-check method for the access control object associated with the one of the multiplicity of objects is performed to determine whether to grant access.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a nonvolatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc. The term schema as used herein refers to the logical description of data in a database, including definitions and relationships of data.

Figure 1:
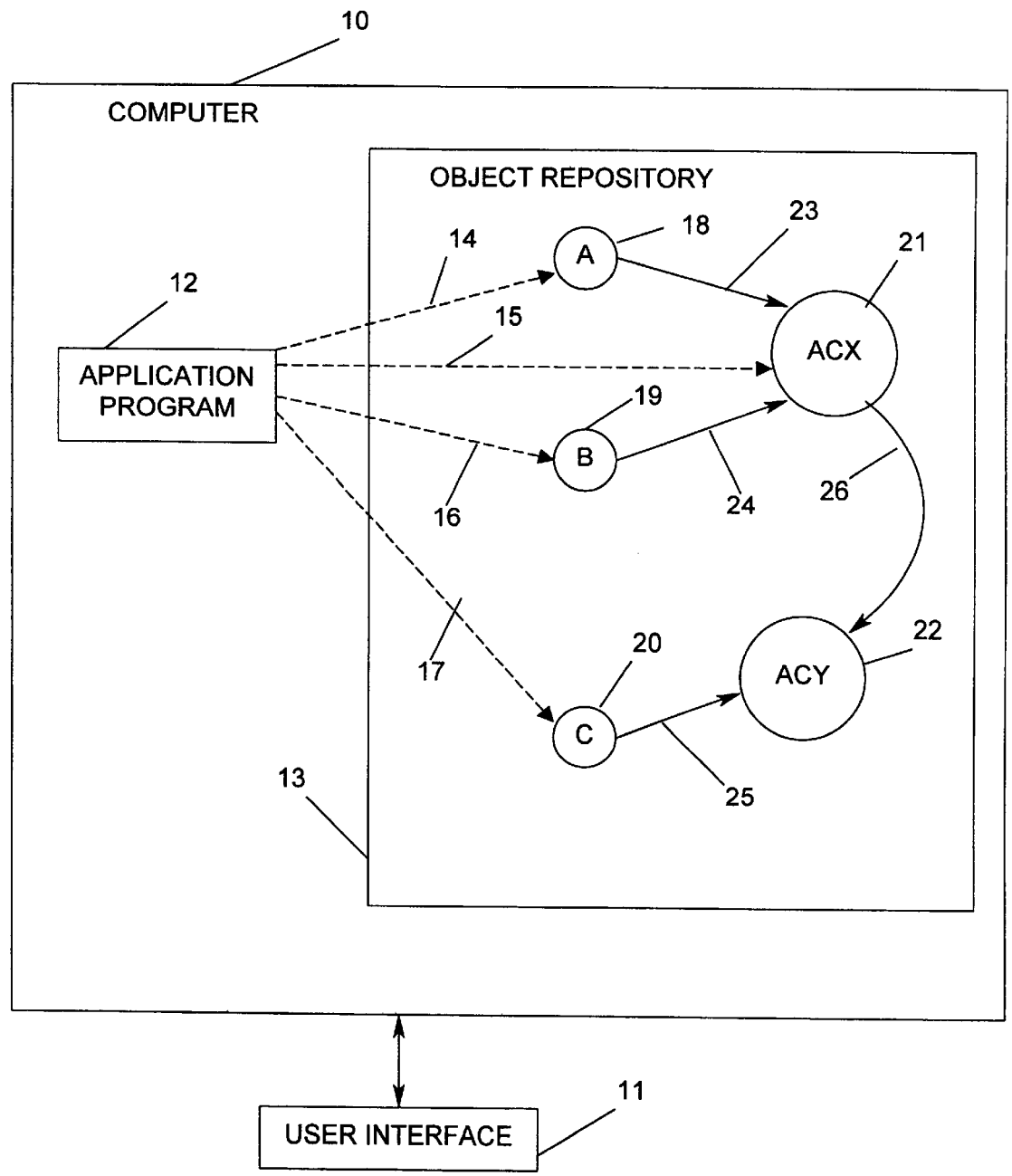
FIG. 1 is a block diagram of a system using the access control of the present invention.

Referring now to FIG. 1, a block diagram of a system using the access control of the present invention is shown. A Computer system 10 having a standard user-interface 11 is shown. The computer system executes software such as an application program 12 and an object-oriented repository 13. This invention provides a method for controlling access (as shown by broken arrows 14, 15, 16 and 17) from the application program 12 to any object stored in the repository 13. Shown within the object repository are objects 18, 19, 20, 21 and 22. The objects 18, 19 and 20 are software objects that are associated with Access Control Objects 21 and 22 as depicted by arrows 23, 24 and 25. Also shown is an arrow 26 that depicts that one of the Access Control Objects 21 functions as the Access Control Object for the second Access Control Object 22.

In order to understand the working of the access control functionality as shown by FIG. 1, assume that a user running the Application Program 12 through the user-interface 11 requests access to the software object 19 in the repository 13. The application program sends an access request as depicted by arrow 16 to the object 19. When the software object 19 receives the access request, it passes on the parameters of the user and the nature of access needed to the Access Control Object 21 as depicted by arrow 24. The access control object 21 performs an operation to determine whether or not to grant access to the user. If the operation results in a 'grant access condition', then access is granted, otherwise the user is denied access to the object 19.

The repository 13 further includes tools for cataloging, browsing, and managing components that make up an application. Methods to support these services are disclosed in several patents and patent applications assigned to the assignee of this application, including U.S. Pat. No. 5,671, 398 for METHOD FOR COLLAPSING A VERSION TREE WHICH DEPICTS A HISTORY OF SYSTEM DATA AND PROCESSES FOR AN ENTERPRISE; U.S. Pat. No. 5,644, 764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848, 273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
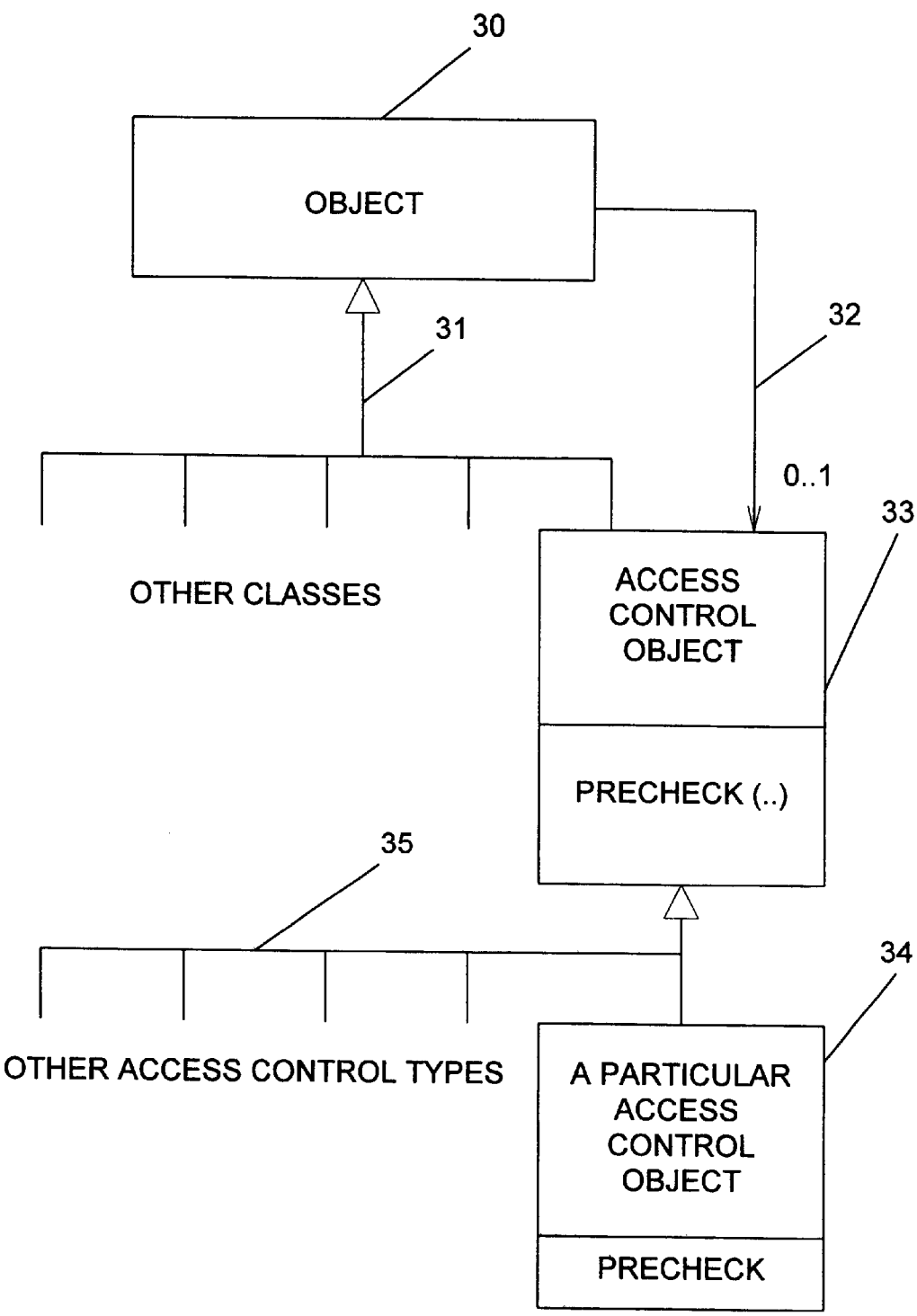
FIG. 2 is partial class diagram illustrating classes and their properties for implementing the access control functionality.

Referring now to FIG. 2, a class diagram illustrating the classes and their operations needed to implement the Access Control Functionality of this invention is shown. The RSM model has an owner class called Object 30 whose methods and properties are disclosed in several patents and patent applications, cited above, that have been assigned to the assignee of this application. The Object class owns all other classes as shown by the arrow 31. Thus, all objects in the repository derive their methods and properties from the Object 30 class.

The Object 30 class provides a single-valued reference 32 called Access_Control_Object (block 33) to an object of this class. When the reference is null, access to the object is granted. At most, only one reference (e.g., Access_Control_Object 33) is provided for each object in the repository 13. The Access_Control_Object 33 controls access to the object as well as its features. The Access_Control_Object 33 has an operation called pre-check as illustrated within the block 33. Arguments to pre-check indicate the object being accessed, the feature, and the kind of access. If pre-check returns TRUE, access is granted. If FALSE, access is denied.

This invention also provides an extensible mechanism by which tool and model developers can define their own access control methods. The RSM model provides no subclass of the Access Control Object 33. A developer is free to define a subclass (e.g., block 34) with its own pre-check method in order to implement an access control policy with whatever behavior the developer wants. Moreover, the developer is free to define Other Access Control Types 35. The policy can be simple or complicated. The pre-check method can also be defined to have side effects. For example, it can be used to log access to objects and features. Also, a pre-check method can be defined to control access to an Access Control Object itself.

This invention uses the above mentioned objects and classes to implement a simple access control model called Ownership-based Access Control. Under this model, access control can be applied to all persistent objects, including meta-objects, access control objects, and objects defined by models that make no consideration of access control. Whenever an object is constructed in the repository, a method is defined for the object which invokes access control on each external call to the object. Internal calls (those from within a method on the same object) are uncontrolled. Also under this model, access control is bypassed for system administrators. This model is designed so that access control imposes negligible performance impact on accessing uncontrolled objects. Specifically, the average execution time for accessing controlled objects, apart from any execution of the method of checking access, is not more than 50% greater than the average time for accessing the same objects when uncontrolled. A feature of this invention is that it works the same for all platforms and databases supported by Urep.

Figure 3A:
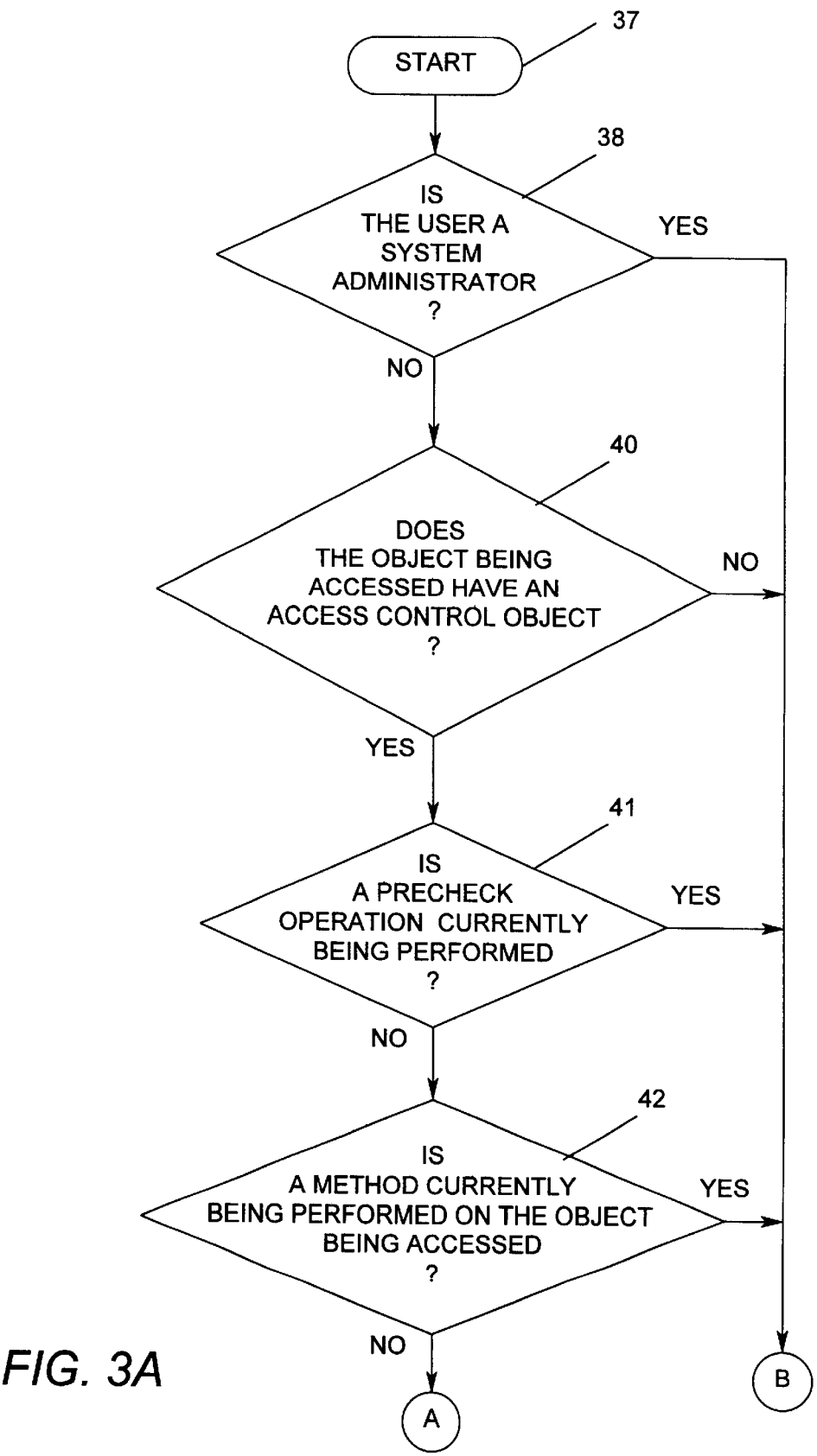
FIGS. 3A and 3B illustrate a flow chart for an Ownership-based Access Control Model which is the process for determining whether to grant access or not.

Referring now to FIG. 3A, the first of two sheets (FIGS. 3A and 3B) illustrate a flow chart of the process for determining whether to grant access or not. A start bubble 37 is followed by a step of making an inquiry 38 to determine whether or not the user is a system administrator. If the answer to this inquiry is yes, then the process continues as shown by a connector B to FIG. 3B. On the other hand, if the answer to this inquiry is no then another inquiry 40 is made to determine whether or not the object being accessed has an access control object. If the answer to this inquiry is no, then the process continues as shown in FIG. 3B as denoted by the connector B.

On the other hand, if the answer to the inquiry depicted by the diamond 40 is yes, then another inquiry 41 is made to determine whether or not a pre-check operation is currently being performed. If the answer to this inquiry is yes, then the process continues in FIG. 3B at the connector B. On the other hand, if the answer to this inquiry is no, then another inquiry is made to determine whether or not a method is currently being performed on the object being accessed. If the answer to this inquiry is yes, then the process continues in FIG. 3B at the connector B. On the other hand, if the answer to this inquiry is no, then the process illustration continues in FIG. 3B at a connector A.

Figure 3B:
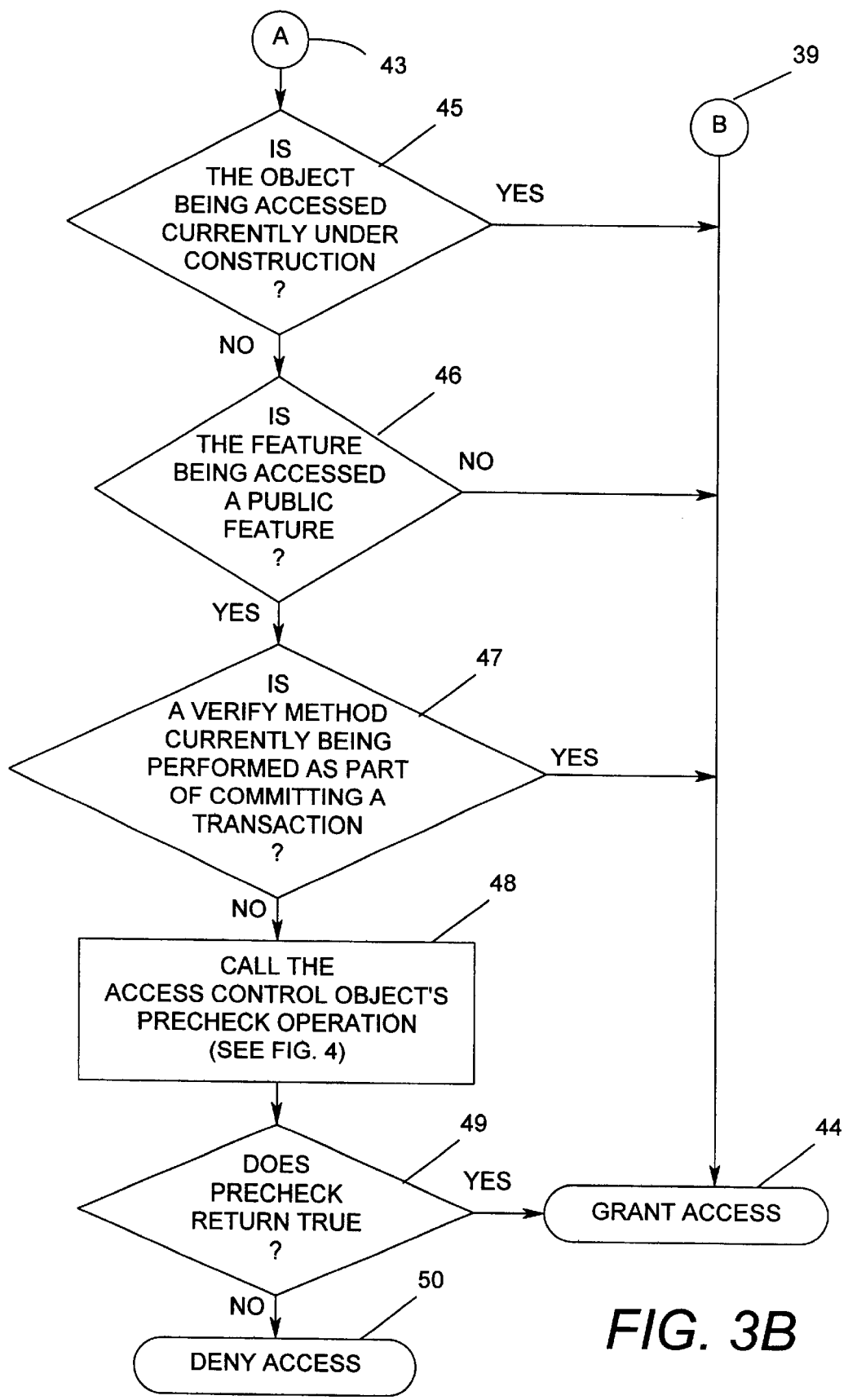

Referring now to FIG. 3B at the connector B, access to the object is granted (bubble 44) and the process ends. With reference now to the connector A, an inquiry 45 is made as to determine whether or not the object being accessed is currently under construction. If the answer to this inquiry is yes, then access to the object is granted (bubble 44). On the other hand, if the answer to the inquiry is no, then another inquiry 46 is made to determine if the feature being accessed is a public feature. If the answer to this inquiry is no, then access to the object is granted.

On the other hand, if the answer to the inquiry depicted by the diamond 46 is yes, then another inquiry 47 is made to determine whether or not a verify method is currently being performed as a part of committing a transaction. If the answer to this inquiry is yes, then access to the object is granted. On the other hand, if the answer to this inquiry is no, then a call is made to the access control object's pre-check operation (block 48). Following this step, an inquiry 49 is made to determine if the result of the pre-check is TRUE. If the answer to this inquiry is yes then access to the object is granted. On the other hand, if the answer to this inquiry is no, then access to the object is denied (bubble 50) and the process ends.

Figure 4A:
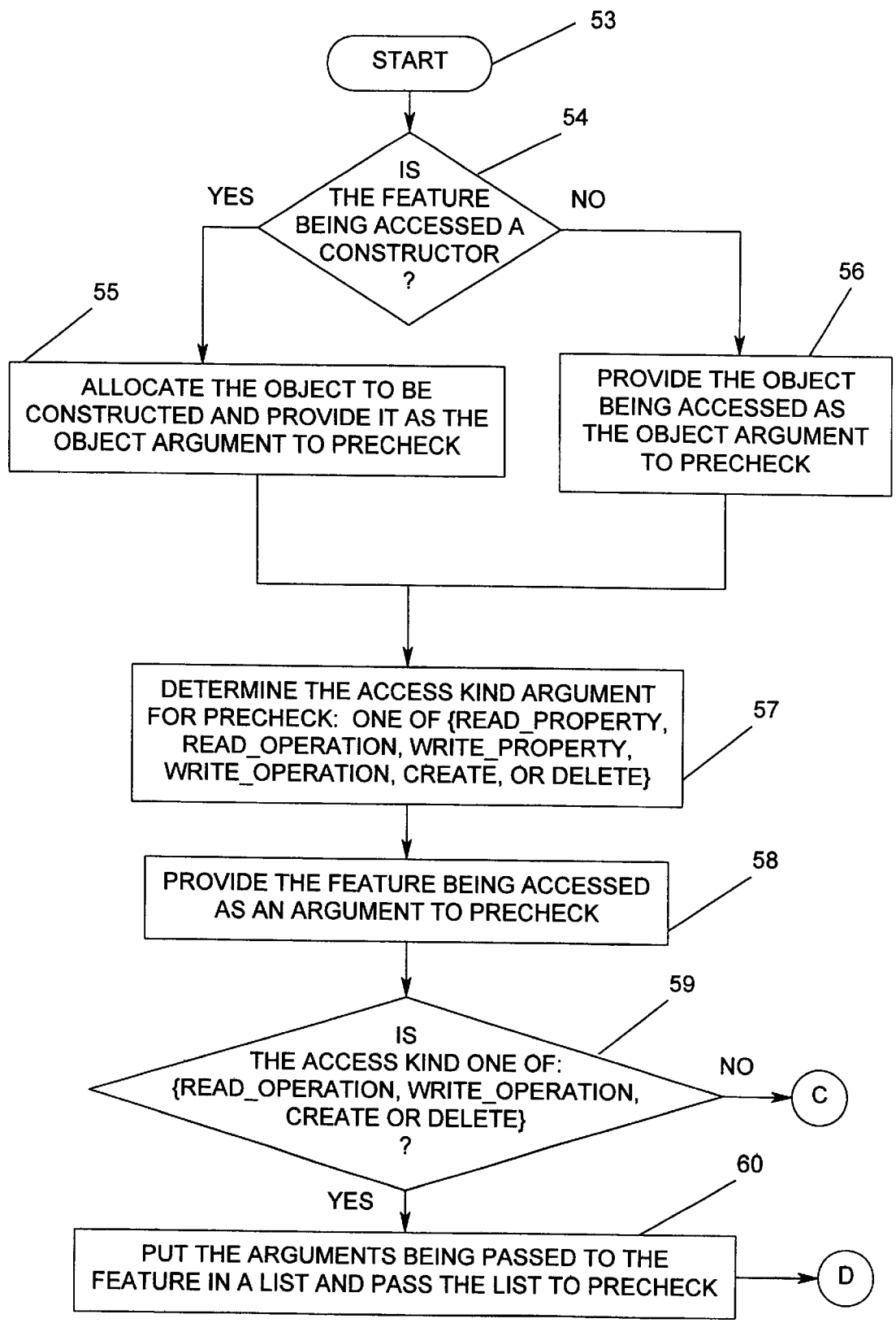
FIGS. 4A and 4B illustrate a flow chart for the call pre-check process.

Referring now to FIG. 4A, the first of two sheets (FIGS. 4A and 4B) that illustrate a flow chart for the call pre-check process is shown. A start bubble 53 is followed by a step of making an inquiry 54 to determine whether or not the feature being accessed is a constructor. If the answer to this inquiry is yes, then the object to be constructed is allocated and provided as an argument to pre-check (block 55). On the other hand, if the answer to the inquiry depicted by the diamond 54 is no, then the object being accessed is provided as the object argument to pre-check (block 56). Upon completion of either of the steps depicted by the blocks 55 or 56, the process continues with a step of determining the kind of access required as being one of read_property, read_operation, write_property, write_operation, create, or delete (block 57). This step is followed by a step of providing the feature being accessed as an argument to pre-check (block 58).

Next, an inquiry 59 is made to determine if the access kind is one of read_operation, write_operation, create or delete. If the answer to this inquiry is no, then the process continues in FIG. 3B at a connector C. On the other hand, if the answer to this inquiry is yes, then a step 60 of putting the arguments being passed to the feature in a list and passing the list to pre-check is executed. After this, the process then continues in FIG. 4B at a connector D.

Figure 4B:
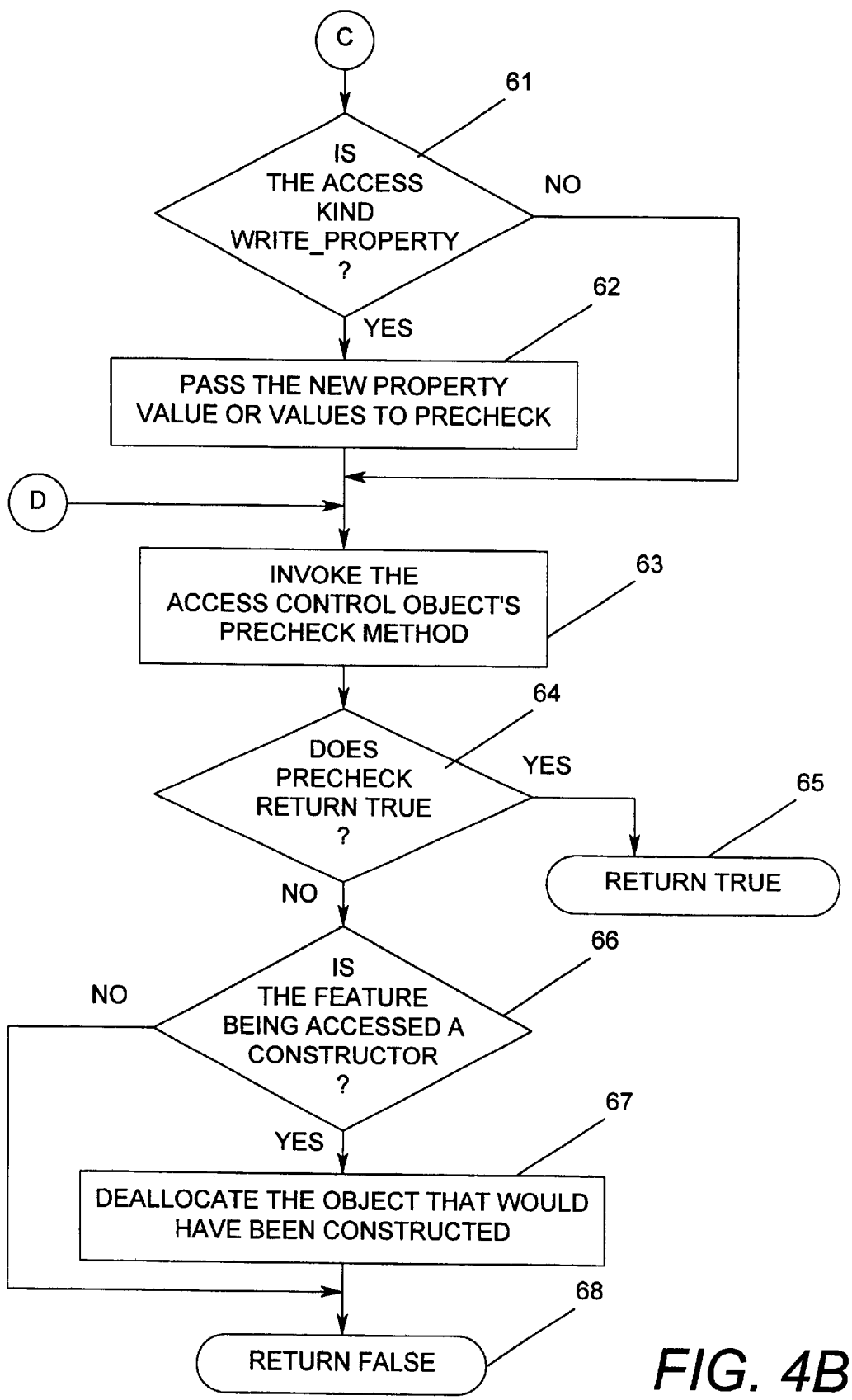

Referring now to FIG. 4B at the connector C, an inquiry 61 is made to determine whether or not the access kind is write_property. If the answer to this inquiry is yes, then the new property value or values is passed to pre-check (block 62). On the other hand, if the answer to this inquiry is no, then the step depicted by the block 62 is bypassed and the process continues with the next step at a block 63. Also, the connector D intercepts the process at this point. The access control object's pre-check method is next invoked (block 63). After this, an inquiry 64 is made to determine if the access control policy as defined by the pre-check returned a TRUE. If the answer to this inquiry is yes, then a TRUE Boolean is returned (bubble 65) and the process ends. On the other hand, if the answer to this inquiry is no, then another inquiry 66 is made to determine if the feature being accessed is a constructor. If the answer to this inquiry is no, then a FALSE Boolean is returned (bubble 68) and the process ends. On the other hand, if the answer to the inquiry 66 is yes, then a step of de-allocating the object that would have been constructed is executed and a FALSE Boolean is returned (bubble 68) and the process ends.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented object-oriented method for controlling access to a multiplicity of objects, said method comprising the steps of:

a. creating specific access control object types, each including a pre-check method for implementing a pre-defined access control policy;

b. associating each one of said multiplicity of objects to be controlled with one of said access control objects;

c. upon an attempt to invoke a feature of any one of said multiplicity of objects, determining if said one of said multiplicity of objects is linked to an access control object, and if yes;

d. performing the pre-check method for said access control object associated with said one of said multiplicity of objects to determine whether to grant access wherein, prior to performing said pre-check method, there is performed the step of determining if any conditions exist that allow automatic access to be granted to any one of said multiplicity of objects, and if so, granting access to said one of said multiplicity of objects, wherein said step of granting access grants access to said one of said multiplicity of objects if a method of said one of said multiplicity of objects is currently being performed.

2. The method as in claim 1 wherein it is determined that said one of said multiplicity of objects is not associated with an access control object, further including the step of granting access thereto.

3. The method as in claim 1 wherein said step of granting access grants access to said one of said multiplicity of objects if a user of said computer-implemented method is a system administrator.

4. The method as in claim 1 wherein said step of granting access grants access to said one of said multiplicity of objects if said one of said multiplicity of objects does not have an associated access control object.

5. The method as in claim 1 wherein said step of granting access grants access to said one of said multiplicity of objects if said feature is not a public feature.

6. The method as in claim 1 wherein said step of granting access grants access to said one of said multiplicity of objects if a verify method is currently being performed as part of committing a transaction.

7. The method as in claim 1 where in step d thereof further including the steps of:

e. determining if said feature is a constructor, and if so;

f. allocating a new object for construction and passing it on as an object argument to said pre-check; and, g. if pre-check denies access, de-allocating said new object that would have been constructed had access been granted.

8. The method as in claim 1 where in step d thereof further including the steps of:

e. determining if said feature is a constructor, and if not;

f. providing the object being accessed as the object argument to said pre-check.

9. The method as in claim 1 where in step d thereof further including the step of determining an access kind and passing access kind on as an argument to said pre-check.

10. The method as in claim 1 where in step d thereof further including the step of providing the feature being accessed as an argument to said pre-check.

11. The method as in claim 2 where in step d thereof further including the steps of:

e. determining if said feature is an operation, and if so;

f. collecting arguments to said operation in a list and passing said list to said pre-check.

12. The method as in claim 9 further including the step of determining if said access kind is write_property, and if so, passing new property value to said pre-check.

13. The method as in claim 7 wherein it is determined that said feature of said object is not a constructor, providing said object being accessed as an object argument to said pre-check.

14. A storage medium encoded with machine-readable computer program code for controlling access to a multiplicity of objects, wherein, when the computer program code is executed by a computer, the computer performs the steps of:

a. creating specific access control object types, each including a pre-check method for implementing a predefined access control policy;

b. associating each one of said multiplicity of objects to be controlled with one of said access control objects;

c. upon an attempt to invoke a feature of any one of said multiplicity of objects, determining if said one of said multiplicity of objects is linked to an access control object, and if yes;

d. performing the pre-check method for said access control object associated with said one of said multiplicity of objects to determine whether to grant access thereto, wherein access is granted to said one of said multiplicity of objects if a method of said-one of said multiplicity of objects is currently being performed.

15. The storage medium as in claim 13 wherein it is determined that said one of said multiplicity of objects is not associated with an access control object, further including the step of granting access thereto.

16. The storage medium as in claim 13 further comprising the step of determining prior to performing said pre-check method if any conditions exist that allow automatic access to be granted to any one of said multiplicity of objects, and if so, granting access to said one of said multiplicity of objects.

17. The storage medium as in claim 13 wherein said step of granting access grants access to said one of said multiplicity of objects if a user of said computer-implemented method is a system administrator.

18. The storage medium as in claim 13 wherein said step of granting access grants access to said one of said multiplicity of objects if said one of said multiplicity of objects does not have an associated access control object.

19. The storage medium as in claim 13 wherein said step of granting access grants access to said one of said multiplicity of objects if a method of said one of said multiplicity of objects is currently being performed.

* * * * *